(12) United States Patent
Ranganathan et al.

(10) Patent No.: US 8,683,790 B2
(45) Date of Patent: Apr. 1, 2014

(54) NOZZLE DIFFUSER MIXER

(75) Inventors: Raj P. Ranganathan, Rochester Hills, MI (US); Sandro Balestrino, Plymouth, MI (US); Robert D. Straub, Lowell, MI (US); Xiaobin (Sharon) Li, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 641 days.

(21) Appl. No.: 12/615,618

(22) Filed: Nov. 10, 2009

(65) Prior Publication Data

US 2011/0107743 A1  May 12, 2011

(51) Int. Cl.
  *F01N 3/00* (2006.01)
  *F01N 3/10* (2006.01)
  *F01N 1/00* (2006.01)

(52) U.S. Cl.
  USPC ............ 60/324; 60/295; 60/301; 60/303

(58) Field of Classification Search
  USPC ............ 60/286, 295, 301, 303, 324
  See application file for complete search history.

(56) References Cited

U.S. PATENT DOCUMENTS

| RE19,412 | E | 1/1935 | Zaparka | |
|---|---|---|---|---|
| 7,328,572 | B2* | 2/2008 | McKinley et al. | 60/286 |
| 2007/0163241 | A1* | 7/2007 | Meingast et al. | 60/286 |
| 2007/0204751 | A1* | 9/2007 | Wirth et al. | 96/290 |
| 2009/0071133 | A1* | 3/2009 | Mabuchi | 60/303 |
| 2010/0005790 | A1* | 1/2010 | Zhang | 60/301 |
| 2010/0058738 | A1* | 3/2010 | Webb et al. | 60/285 |
| 2011/0047974 | A1* | 3/2011 | Henry et al. | 60/274 |

FOREIGN PATENT DOCUMENTS

JP     2005155404 A  *  6/2005  ............... F01N 3/24

OTHER PUBLICATIONS

Troolin, D.R., et al., Time Resolved PIV Analysis of a Gurney flap on a NACA 0015 Airfoil—6th International Symposium on Particle Image Velocimetry, Pasadena, CA, Sep. 21-23, 2005, pp. 1-15.

* cited by examiner

*Primary Examiner* — Audrey K Bradley
(74) *Attorney, Agent, or Firm* — Cantor Colburn LLP

(57) ABSTRACT

A diffuser for aiding in the vaporization and mixing of an injected reactant with the exhaust gas feed stream of an exhaust gas aftertreatment system is disclosed. The diffuser is disposed within an exhaust gas conduit of the exhaust gas aftertreatment system and has an impingement surface and a baffle plate disposed downstream of and adjacent thereto. The baffle plate extends outwardly from the diffuser, to terminate at a baffle plate tip that is located intermediate of the diffuser and an inner wall of the exhaust gas conduit. The baffle plate is operable to trap a portion of an exhaust gas feed stream, and a reactant resident therein, to increase the vaporization and residence time of the reactant in the exhaust gas feed stream.

13 Claims, 4 Drawing Sheets

NOZZLE DIFFUSER MIXER

FIELD OF THE INVENTION

Exemplary embodiments of the present invention are directed to an exhaust gas treatment system for an internal combustion engine and, more particularly to an apparatus for efficient mixing of a reactant with the exhaust gas.

BACKGROUND

The exhaust gas produced by the combustion of air and fuel in an internal combustion engine includes regulated constituents such as carbon monoxide ("CO"), unburned hydrocarbons ("HC") oxides of nitrogen ("$NO_x$") and, in the case of diesel engines, condensed phase materials (liquids and solids) which constitute particulate matter. Manufacturers of internal combustion engines are increasingly focused on the development of engine control strategies that satisfy both customer demands for performance as well as various government regulations for exhaust gas emissions and fuel economy. One such engine control strategy comprises operating an internal combustion engine at an air/fuel ratio that is lean of stoichiometry to improve fuel economy and reduce greenhouse gas emissions. Such operation is possible using both compression-ignition (diesel) and lean-burn spark-ignition (gasoline) engines. When an engine operates with a lean (excess oxygen) air/fuel ratio, the exhaust gas may contain higher levels of engine-out $NO_x$ emissions. Commercial application, especially automotive application of lean operating engines, has been limited due to a lack of effective methods for the removal of $NO_x$ under a lean exhaust condition. As such, the efficient reduction of $NO_x$ ($NO_x=NO+NO_2$) from diesel and lean-burn gasoline exhaust gas is important to meet future emission standards and improve fuel economy.

Reduction of $NO_x$ emissions from an exhaust gas feed stream containing excess oxygen is a challenge for vehicle manufacturers. Several potential aftertreatment systems have been proposed for vehicle applications. One approach comprises using an aftertreatment system that includes injecting a $NO_x$ reductant (e.g. aqueous urea), upstream of a urea-SCR catalyst, to reduce $NO_x$ to $N_2$. The use of urea as a reductant necessitates the implementation of a urea storage and distribution system on board the vehicle. Part of such a storage and distribution system comprises an apparatus for effective introduction of the urea into the exhaust gas feed stream in a manner that allows for evaporation and mixing of the urea with the exhaust gas. The urea requires adequate mixing and residence time in the hot exhaust gas stream to decompose to produce ammonia ("$NH_3$") as a reaction by-product, since it is the $NH_3$ that is used as a reactant species in the catalytic reactions that occur in the urea-SCR catalyst device. Introduction of the urea into the exhaust gas feed stream may be through an injection device, similar to a fuel injector, that is in fluid communication with a source of liquid urea. Because urea has a latent heat of vaporization which is significantly greater than that of fuel, for example, additional devices may be placed into the exhaust gas feed stream, downstream of the injection site, to assist in evaporation and mixing. One such device is an impaction plate or nozzle diffuser that is configured to capture larger droplets of the injected urea on its surface for eventual evaporation caused by exposure to the exhaust gas flow. While such nozzle diffusers have met with some success, the vaporization rate of the urea has varied from 50 to 70%. Such a rate results in higher than desired consumption of the urea reactant as well as deposition of liquid urea on the downstream urea-SCR catalyst device which may degrade its performance.

SUMMARY OF THE INVENTION

In one exemplary embodiment of the present invention, a diffuser for aiding in the vaporization and mixing of an injected reactant with the exhaust gas feed stream of an exhaust gas aftertreatment system of an internal combustion engine is disclosed. The diffuser is disposed within an exhaust gas conduit of the exhaust gas aftertreatment system and has an upstream end and a downstream end. An impingement surface is located on the diffuser between the upstream end and the downstream end and a baffle plate is disposed adjacent to the downstream end and to the impingement surface. The baffle plate extends outwardly from the diffuser, to terminate at a baffle plate tip that is located intermediate of the diffuser and an inner wall of the exhaust gas conduit. The baffle plate is operable to trap a portion of an exhaust gas feed stream, and a reactant resident therein, to increase the vaporization and residence time of the reactant in the exhaust gas feed stream.

In another exemplary embodiment of the present invention, an exhaust aftertreatment system for an internal combustion engine comprises an exhaust gas conduit is configured to receive and conduct an exhaust gas feed stream from an internal combustion engine. A $NO_x$ reduction catalyst device, in fluid communication with the exhaust gas conduit, is configured to receive the exhaust gas feed stream therefrom. A reductant injector in fluid communication with the exhaust gas conduit is configured to deliver a reductant to the exhaust gas feed stream upstream of the $NO_x$ reduction catalyst device. A diffuser, having an upstream end and a downstream end, is located in the exhaust gas conduit adjacent to the reductant injector. The diffuser has an impingement surface that is configured to collect un-vaporized reductant for vaporization thereon. A baffle plate is disposed adjacent to the downstream end of the diffuser and adjacent to the impingement surface. The baffle plate extends outwardly from the diffuser to terminate at a baffle plate tip that is located intermediate of the diffuser and an inner wall of the exhaust gas conduit. The baffle plate is operable to trap a portion of the exhaust gas feed stream, and reactant resident therein, to increase the vaporization and residence time of the reactant in the exhaust gas feed stream.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects features, advantages and details appear, by way of example only, in the following detailed description of embodiments, the detailed description referring to the drawings in which.

DESCRIPTION OF THE EMBODIMENTS

Figure 1:
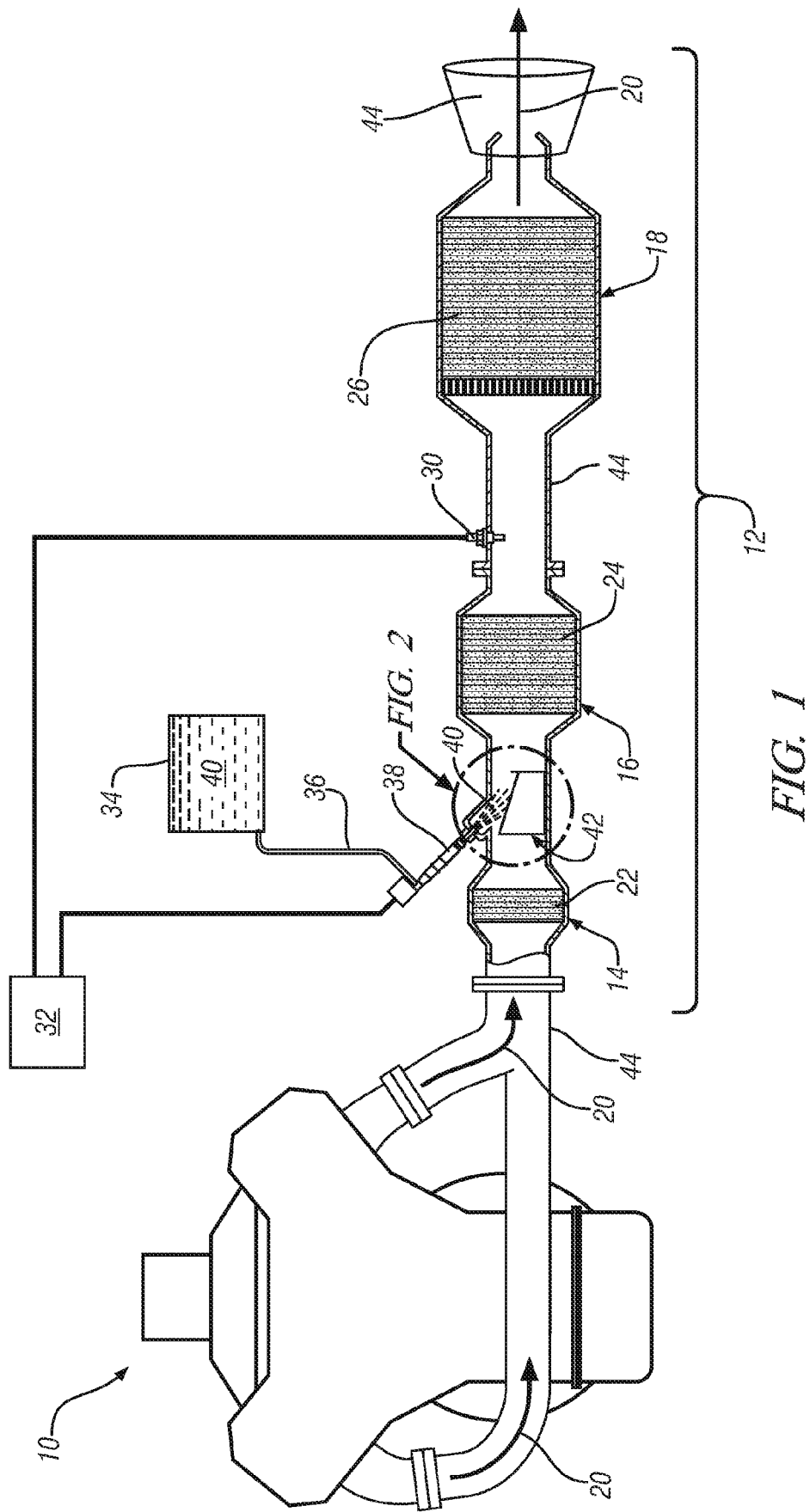
FIG. 1 is schematic view of an internal combustion engine and an associated exhaust treatment system embodying features of the present invention.

The following description is merely exemplary in nature and is not intended to limit the present disclosure, application or uses. It should be understood that throughout the drawings, corresponding reference numerals indicate like or corresponding parts and features.

Referring to FIG. 1, a schematic diagram depicts an exemplary embodiment of an internal combustion engine 10 that is particularly suitable for use in many types of motorized vehicles (not shown) such as automobiles and light and heavy duty trucks as well as in non-vehicular applications such as marine and stationary uses. The engine 10 may include a known compression ignition or diesel engine having an operating regime that is primarily lean-burn. As such, it is operated on a fuel/air mixture where the amount of fuel is lower or leaner than that required for stoichiometric combustion. Alternately the engine 10 may include a gasoline engine employing one of a number of engine control strategies that operate lean of stoichiometry. During operation, the internal combustion engine 10 generates an exhaust gas feed stream or flow 20 that contains regulated constituents as combustion by-products. These exhaust constituents must be transformed into unregulated constituents prior to release to the environment. The constituents of the exhaust gas feed stream 20 produced by engine 10 under lean combustion conditions may include HC, CO, $NO_x$ and particulate matter, among others.

The internal combustion engine 10 employs an exhaust gas after-treatment system 12 that has been constructed in accordance with the present invention. In an exemplary embodiment illustrated in FIG. 1, the exhaust gas after-treatment system 12 includes an oxidation catalyst device 14 that is located upstream of a $NO_x$ reduction catalyst device 16, such as a urea-SCR catalyst device. In the case of an internal combustion engine 10 that is a diesel engine, the exhaust gas after-treatment system 12 may also include a particulate filter 18. An exhaust gas conduit 44 fluidly connects the engine 10 with each of the oxidation catalyst device 14, the $NO_x$ reduction catalyst device 16 and the particulate filter 18 and conducts the exhaust gas feed stream 20 from the engine to each of the devices prior to its release to the atmosphere. The oxidation catalyst device 14 may include any suitable catalyst material that provides a selective reduction of HC and CO in the exhaust gas feed stream 20. The catalyst may be disposed as a washcoat on a suitable substrate 22 that may comprise a ceramic or a metal honeycomb structure. Exhaust gas passages, which are essentially straight paths from the fluid inlet to the fluid outlet of the substrate 22, are defined by walls on which the catalytic material is coated so that the exhaust gas feed stream flowing through the oxidation catalyst device 14 contacts the catalytic material to thereby initiate the conversion process. As the exhaust gas feed stream 20 traverses the length of the oxidation catalyst device 14 the catalyst catalyzes the oxidation of CO to $CO_2$, as well as catalyzing the oxidation of various hydrocarbons, including gaseous HC and liquid HC particles including unburned fuel or oil as well as HC reductants that may have been introduced into the exhaust gas stream 20 to form $CO_2$ and $H_2O$.

The NOx reduction catalyst device 16 may include any suitable catalyst material that provides a selective reduction in $NO_x$ in the exhaust gas feed stream 20. The catalyst may be disposed as a washcoat on a suitable substrate 24 that may comprise a ceramic or a metal honeycomb structure. In a manner similar to that described above, exhaust gas passages are defined by walls on which the catalytic material is coated so that the exhaust gas feed stream flowing through the $NO_x$ reduction catalyst device 16 contacts the catalytic material to thereby initiate the conversion process. As the exhaust gas feed stream 20 traverses the length of the $NO_x$ reduction catalyst device 16 the catalyst catalyzes the reduction of $NO_x$, in the presence of an ammonia based reductant, such as urea in the case of a urea-SCR catalyst device, which has been introduced into the exhaust gas stream 20.

The particulate filter device 18, if applicable, is configured to filter the exhaust gas feed stream in order to remove carbon and other particulates suspended therein. The particulate filter device may utilize a ceramic wall flow substrate 26. Unlike the substrates thus far described, exhaust gas 20 entering the particulate filter device 18 will be forced to migrate through longitudinally extending, porous walls prior to exiting the filter. It is through this wall flow mechanism that the exhaust gas is filtered of carbon and other particulates.

Figure 2:
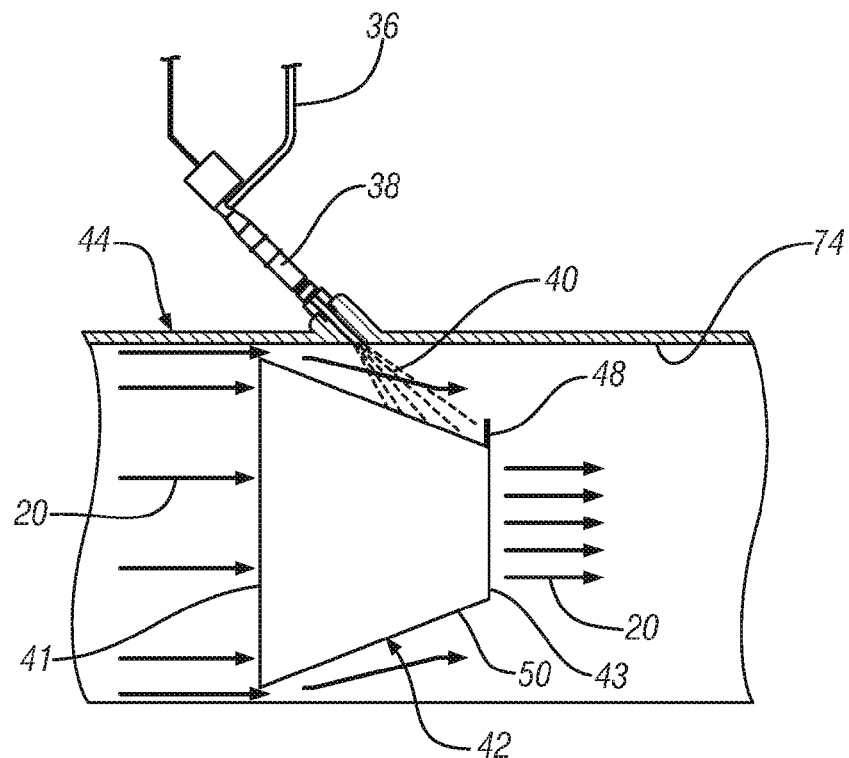
FIG. 2 is an enlarged portion of the exhaust treatment system of FIG. 1.

Referring to FIGS. 1 and 2, in a preferred embodiment, the $NO_x$ reduction catalyst device 16 is part of a $NO_x$ reduction system that includes a sensor 30 located downstream of $NO_x$ reduction catalyst device 16 and in fluid communication with the exhaust gas feed stream 20. The sensor 30 is in signal communication with a controller 32, such as an engine controller or other suitable vehicle controller that is operably connected to, and monitors, the exhaust gas treatment system 12 through a number of sensors. As used herein the term controller refers to an application specific integrated circuit (ASIC), an electronic circuit, a processor (shared, dedicated or group) and memory that executes one or more software or firmware programs, a combinational logic circuit, and/or other suitable components that provide the described functionality. The sensor 30 operates to communicate information to the controller that is indicative of the level of $NO_x$ constituents resident or suspended in the exhaust gas feed stream 20 downstream of the $NO_x$ reduction catalyst device 16. A reductant storage device such as reductant tank 34 is fluidly connected through reductant supply conduit 36 to a device such as reductant injector 38 that is in fluid communication with the exhaust gas feed stream 20. As with the sensor 30, the reductant injector is in signal communication to the controller 32 and may be energized by the controller to initiate delivery of reductant 40 into the exhaust gas feed stream 20 when $NO_x$ levels in the exhaust gas reach a predetermined level as indicated by the sensor 30.

Figure 3A:
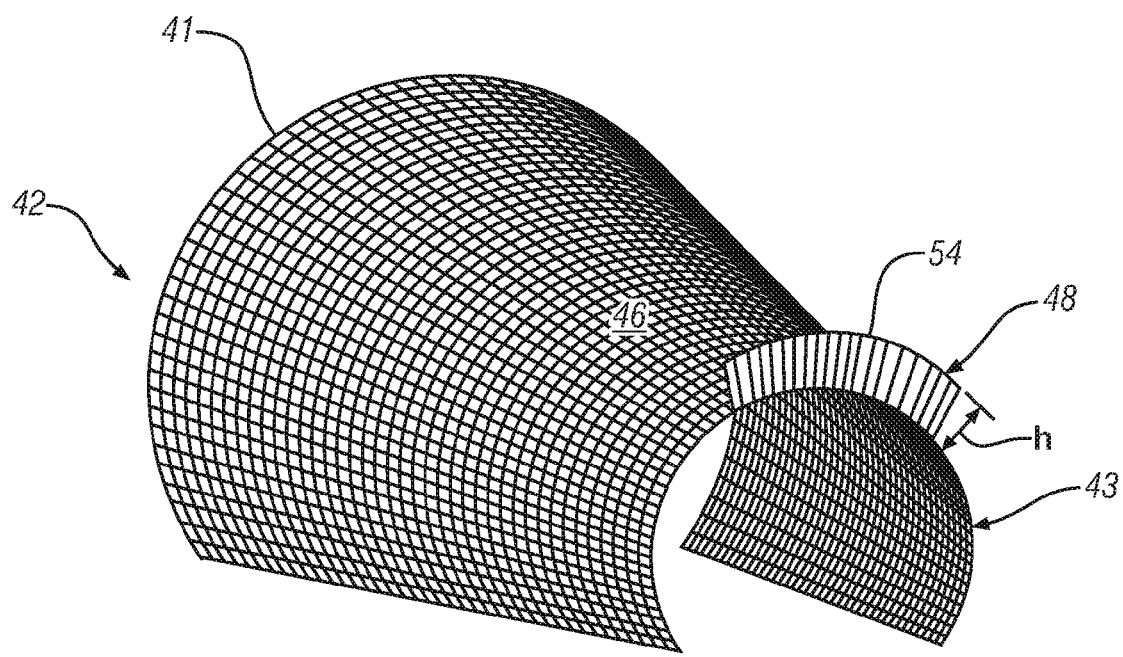
FIGS. 3A, 3B, 3C illustrate exemplary embodiments of an exhaust gas diffuser embodying features of the present invention.
Figure 3B:
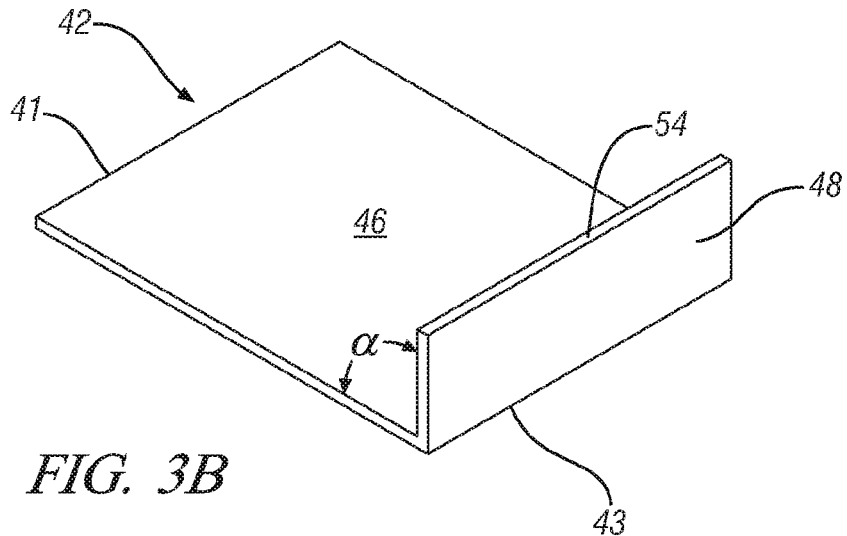
Figure 3C:
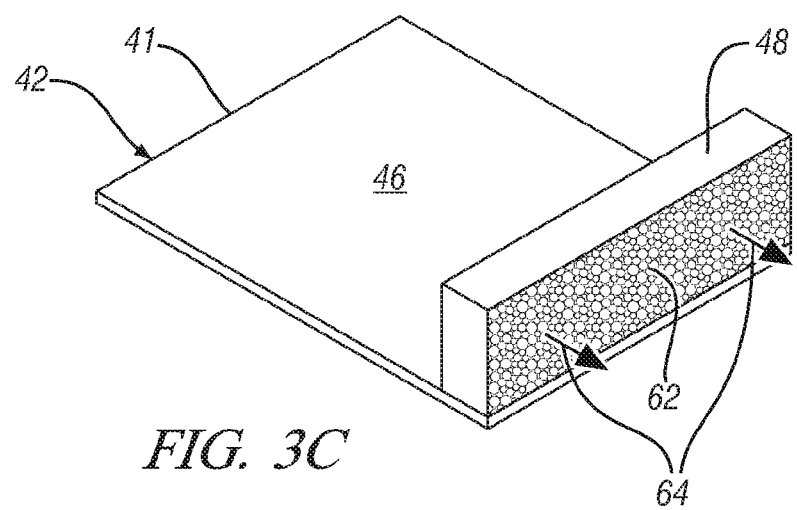

As indicated, the reductant 40 may require adequate mixing and residence time in the hot exhaust gas stream. In the case of a urea-SCR catalyst as the NOx reduction catalyst device 16, an aqueous urea may be utilized as the reductant 40. The urea must vaporize and decompose in the exhaust gas feed stream 20 to produce ammonia ("$NH_3$") as a reaction by-product, since it is the $NH_3$ that is used as a reactant species in the catalytic reactions that occur in the urea-SCR catalyst device. In certain applications where space is at a minimum due to vehicle packaging or other requirements, a semi-conical (FIG. 3A), conical (FIG. 2), flat plate (FIGS. 3B and 3C) or other configuration of diffuser 42, may be located within the exhaust gas conduit 44 of the exhaust gas after-treatment system 12 at a location upstream of the NOx reduction catalyst device 16 and adjacent to the reductant injector 38. The diffuser 42 has an upstream end 41, a downstream end 43 and includes an impingement surface 46 that operates to collect droplets of reductant 40 that may not immediately vaporize when exiting the injector 38. The diffuser 42 may be constructed of metal (ex. stainless steel, sheet steel, etc.) or ceramic or other suitable material for high temperature applications. Flow of the hot exhaust gas feed stream 20 over the impingement surface 46 will aid the vaporization/evaporation of the reductant 40 prior to its flowing downstream and to the NOx reduction catalyst device 16. Due to the high latent heat of vaporization of some reductants such as urea, some unvaporized fluid may escape the impingement surface 46 of the diffuser 42 prior to being fully vaporized.

Figure 4A:
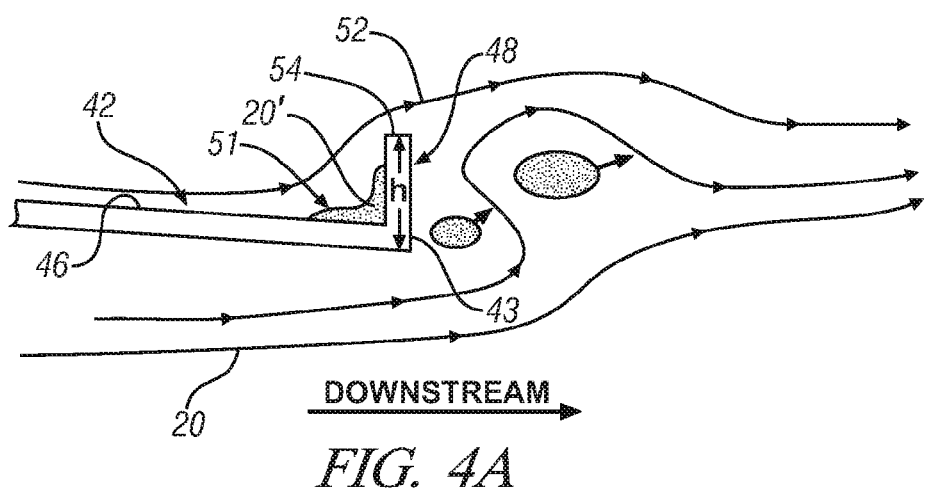
FIGS. 4A, 4B, 4C schematically illustrate the operation of an exhaust gas diffuser embodying features of the present invention.
Figure 4B:
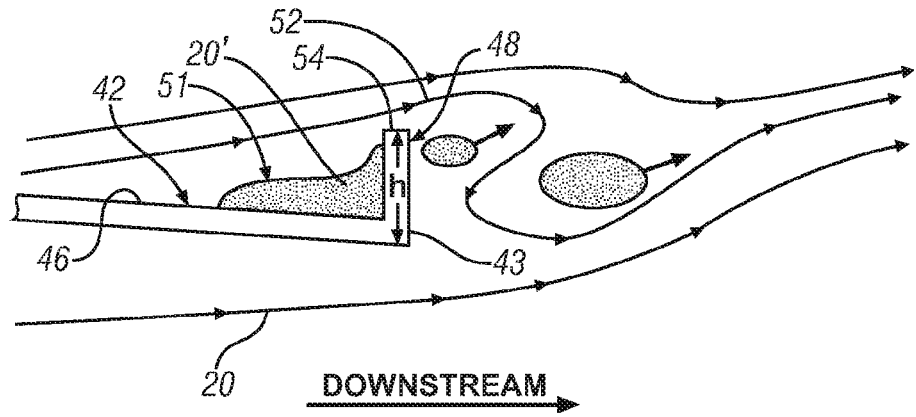
Figure 4C:
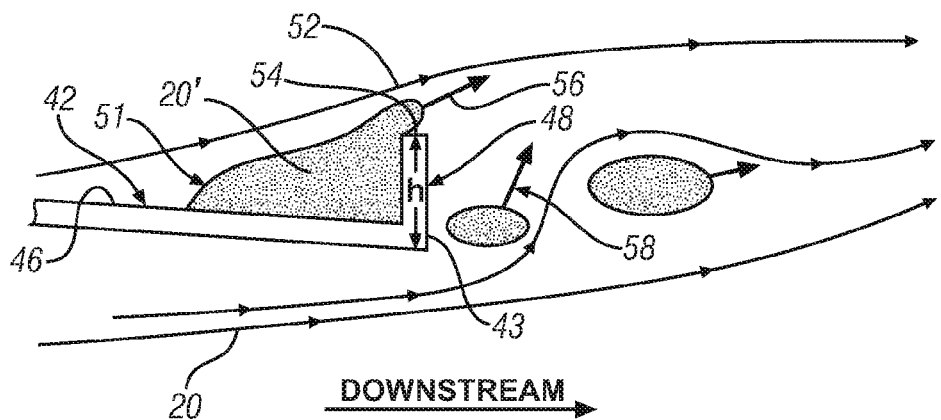

In an exemplary embodiment, illustrated in FIGS. 2, 3A-C and 4A-C, to increase the evaporation rate of the reductant 40 following impingement on the impingement surface 46, a baffle plate or flap 48 is fastened to the downstream or exit end 43 of the diffuser 42. The baffle plate 48 extends outwardly (into the exhaust gas feed stream 20) from the impingement surface 46 to terminate at a baffle plate tip 54 located intermediate of the diffuser 42 and the inner wall 74 of the exhaust gas conduit 44. The baffle plate 48 may extend perpendicular to the direction of the exhaust gas feed stream 20 or may be oriented at an angle α, FIG. 3B, that may vary from the perpendicular on the order of 0° to about 15° in either direction from the perpendicular. Referring particularly to FIGS. 4A-C, the baffle plate 48 creates an upstream facing step which traps a portion 20' of the exhaust gas feed stream 20 in the form of a weak or generally disorganized positive vortex. The trapped portion 20' of the exhaust gas feed stream 20 cannot immediately escape above or over the baffle plate 48 as this would require it to cross the faster moving boundary layer 52 of the exhaust gas feed stream 20. The trapping of a portion 20' of the exhaust gas feed stream 20 operates to increase the residence time of the liquid reductant 40 on the impingement surface 46 and, more significantly upstream of the $NO_x$ reduction catalyst device 16, significantly enhancing evaporation thereof. In an exemplary embodiment, the baffle plate may be constructed of metal sheet or it may be constructed of a metal foam structure 62, FIG. 3C, that will enhance vaporization of the reductant 40 even further. In the case of a baffle plate 48 constructed of metal foam 62, the porous matrix of the metal foam will allow a certain quantity of exhaust flow 64 through the baffle plate 48 without interfering with the function of the plate already described. The porous matrix of the metal foam structure 62 defines a tortuous path for any remaining liquid reductant 40 thereby encouraging complete vaporization of the reductant as it passes through the metal foam baffle plate 48 carried by the limited exhaust flow 64.

After some delay, which may be a factor of the height "h" and angle "α" of the baffle plate 48, the trapped portion 20' of the exhaust gas feed stream 20 that has been accumulating upstream of the baffle plate 48 as a positive vortex 51 will grow spatially, both outwardly from the impingement surface 46 (as viewed sequentially in the FIGS. 4A-C) toward the tip 54 of the baffle plate 48 as well as in the upstream direction until the upstream growth is close to that of the baffle plate height "h". When this occurs, the trapped portion 20' of the exhaust gas feed stream 20 achieves enough energy to penetrate the boundary layer 52 just above the tip 54 of the baffle plate 48. The penetration of the boundary layer 52 of the exhaust gas feed stream 20 is manifested in an increase of velocity 56 normal to the direction of the exhaust gas feed stream 20 just above the baffle plate 48 as the trapped portion 20' of the exhaust gas feed stream 20 leaves its trapped or blocked state by spilling over the tip 54 of the baffle plate 48 and into the downstream vortex. The increase of velocity 56 normal to the direction of the exhaust gas feed stream 20 induces a similar velocity component 58 on the fluid and vortex structures directly downstream of the baffle plate 48 resulting in a rotational turbulence being induced in the exhaust gas feed stream 20. The rotational turbulence further assures thorough mixing and increased residence time of the reductant 40 in the exhaust gas feed stream 20 prior to its entry into the $NO_x$ reduction catalyst device 16. It has been found that the use of the diffuser 42 with the baffle plate 48 has increased urea evaporation rate from 50 to 70% (without the baffle plate) to 85 to 100%.

Figure 5:
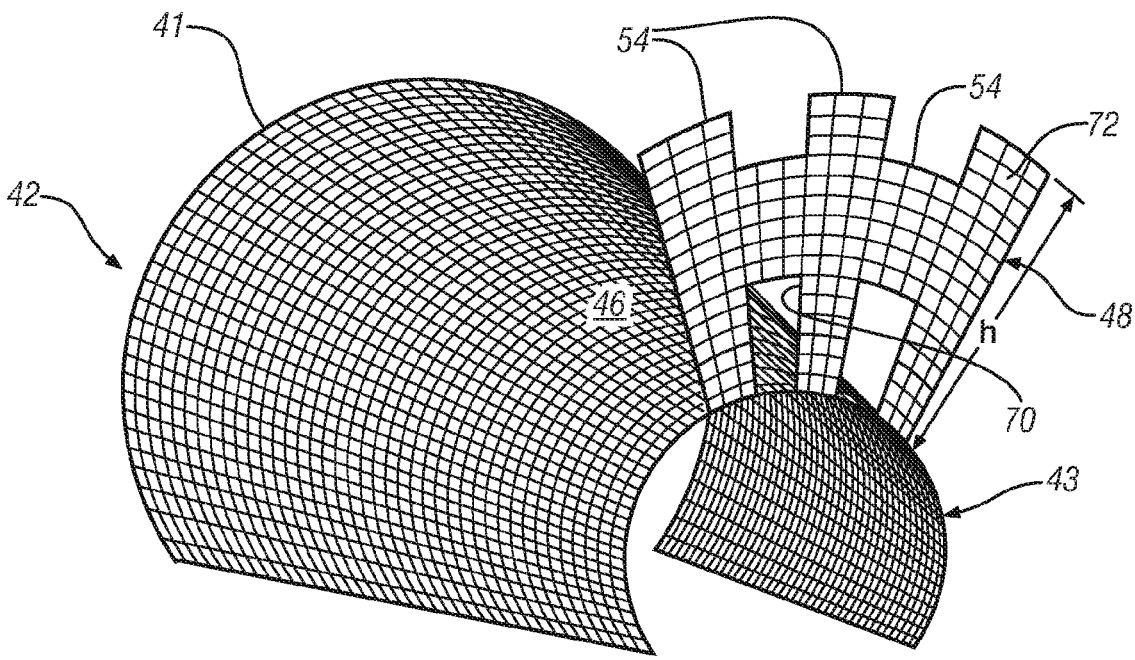
FIG. 5 illustrates an additional exemplary embodiment of an exhaust gas diffuser embodying features of the present invention.

In another exemplary embodiment illustrated in FIG. 5, a nozzle diffuser 42 is illustrated with a baffle plate 48 for improving the evaporation and mixing of the injected reductant 40 with the exhaust gas feed stream 20. In the embodiment shown, a series of spaced perforations 70 are located in the baffle plate 48 at a location adjacent to the impingement surface 46 at the outlet end 43 of the diffuser 42. In addition, a series of spaced flow tabs 72 may extend radially outwardly from the baffle plate tip 54. The addition of the perforations 70 may operate to lessen the backpressure caused by the positive vortex of the earlier described embodiment. As a result, the height "h" of the baffle plate 48 may be increased thereby increasing the surface area of the plate that operates on the exhaust gas feed stream 20 to encourage vaporization and mixing of the urea 40 therein. The spaced flow tabs 72 provide additional "mixing turbulence" to the exhaust gas feed stream adding the function of a turbulator to the baffle plate 48 and enhancing mixing of the reductant 40 with the exhaust gas feed stream. In addition, the flow tabs 72 may extend to and contact the inner wall 74 of the exhaust gas conduit 44 where they may be fixed to the conduit by welding, or other suitable method of attachment, to thereby eliminate cantilevering stresses on the baffle plate 48 thereby reducing or eliminating stress related wear and lower than desired durability.

While the nozzle diffuser and associated baffle plate have been described primarily with respect to the introduction of a reductant into the exhaust gas feed stream of an exhaust gas aftertreatment system for an internal combustion engine, it is contemplated that the apparatus has application beyond the $NO_x$ reduction system. For instance, the device may operate with reactants other than a reductant, and can be adapted to assist in the vaporization and mixing of a reactant such as injected HC upstream of an oxidation catalyst, or a diesel particular filter during regeneration.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A diffuser for aiding in the vaporization and mixing of an injected reactant with the exhaust gas feed stream of an exhaust gas aftertreatment system of an internal combustion engine comprising:
   a diffuser configured to be disposed within an exhaust gas conduit of the exhaust gas aftertreatment system having an upstream end and a downstream end;

an impingement surface located on the diffuser between the upstream end and the downstream end, wherein the diffuser is disposed such that the exhaust gas feed stream flows above and below the diffuser; and a baffle plate disposed adjacent to the downstream end of the diffuser and adjacent to the impingement surface, the baffle plate extending outwardly from the impingement surface at an acute angle relative thereto, to terminate at a baffle plate tip located intermediate of the diffuser and an inner wall of the exhaust gas conduit, and operable to trap a portion of an exhaust gas feed stream, and a reactant resident therein, to increase the vaporization and residence time of the reactant in the exhaust gas feed stream, wherein the diffuser is configured as a flat plate and the baffle plate extends across the downstream end thereof.

2. The diffuser for aiding in the vaporization and mixing of an injected reactant with the exhaust gas feed stream of an exhaust gas aftertreatment system of an internal combustion engine of claim 1, wherein the baffle plate comprises a metal foam material.

3. An exhaust aftertreatment system for an internal combustion engine comprising:

an exhaust gas conduit configured to receive and conduct an exhaust gas feed stream from an internal combustion engine at an upstream end of the exhaust gas conduit;

a catalyst device in fluid communication with the exhaust gas conduit and configured to receive the exhaust gas feed stream therefrom;

an injector in fluid communication with the exhaust gas conduit and configured to deliver a reactant to the exhaust gas feed stream upstream of the catalyst device;

a diffuser, having an upstream end and a downstream end, located in the exhaust gas conduit adjacent to the injector and having an impingement surface configured to collect un-vaporized reactant for vaporization thereon;

a baffle plate disposed adjacent to the downstream end of the diffuser and adjacent to the impingement surface, the baffle plate extending outwardly from the impingement surface at an acute angle relative thereto, to terminate at a baffle plate tip located intermediate of the diffuser and an inner wall of the exhaust gas conduit, and operable to trap a portion of the exhaust gas feed stream, and reactant resident therein, to increase the vaporization and residence time of the reactant in the exhaust gas feed stream; and spaced flow tabs extending outwardly from the baffle plate tip.

4. The exhaust aftertreatment system for an internal combustion engine of claim 3, wherein the reactant is a reductant that is configured to provide ammonia.

5. The exhaust aftertreatment system for an internal combustion engine of claim 3, wherein the reactant is hydrocarbon based.

6. An exhaust aftertreatment system for an internal combustion engine comprising:

an exhaust gas conduit configured to receive and conduct an exhaust gas feed stream from an internal combustion engine at an upstream end of the exhaust gas conduit;

a $NO_x$ reduction catalyst device in fluid communication with the exhaust gas conduit and configured to receive the exhaust gas feed stream therefrom;

an injector in fluid communication with the exhaust gas conduit and configured to deliver a reactant to the exhaust gas feed stream upstream of the $NO_x$ reduction catalyst device;

a diffuser, having an upstream end and a downstream end, located in the exhaust gas conduit adjacent to the injector and having an impingement surface configured to collect un-vaporized reactant for vaporization thereon;

a baffle plate disposed adjacent to the downstream end of the diffuser and adjacent to the impingement surface, the baffle plate extending outwardly from the impingement surface at an acute angle relative thereto, to terminate at a baffle plate tip located intermediate of the diffuser and an inner wall of the exhaust gas conduit, and operable to trap a portion of the exhaust gas feed stream, and reactant resident therein, to increase the vaporization and residence time of the reactant in the exhaust gas feed stream; and spaced perforations in the baffle plate adjacent to the impingement surface.

7. An exhaust aftertreatment system for an internal combustion engine comprising:

an exhaust gas conduit configured to receive and conduct an exhaust gas feed stream from an internal combustion engine at an upstream end of the exhaust gas conduit;

a $NO_x$ reduction catalyst device in fluid communication with the exhaust gas conduit and configured to receive the exhaust gas feed stream therefrom;

an injector in fluid communication with the exhaust gas conduit and configured to deliver a reactant to the exhaust gas feed stream upstream of the $NO_x$ reduction catalyst device;

a diffuser, having an upstream end and a downstream end, located in the exhaust gas conduit adjacent to the injector and having an impingement surface configured to collect un-vaporized reactant for vaporization thereon; and a baffle plate disposed adjacent to the downstream end of the diffuser and adjacent to the impingement surface, the baffle plate extending outwardly from the impingement surface at an acute angle relative thereto, to terminate at a baffle plate tip located intermediate of the diffuser and an inner wall of the exhaust gas conduit, and operable to trap a portion of the exhaust gas feed stream, and reactant resident therein, to increase the vaporization and residence time of the reactant in the exhaust gas feed stream, wherein the diffuser is configured as a semi-conical nozzle and the baffle plate extends circumferentially about the downstream end thereof.

8. The exhaust aftertreatment system for an internal combustion engine of claim 7, further comprising spaced perforations in the baffle plate adjacent to the impingement surface.

9. The exhaust aftertreatment system for an internal combustion engine of claim 7, wherein the baffle plate comprises a metal foam material.

10. The exhaust aftertreatment system for an internal combustion engine of claim 7, wherein the reactant is a reductant that is configured to provide ammonia.

11. The exhaust aftertreatment system for an internal combustion engine of claim 7, further comprising:

a sensor in fluid communication with the exhaust gas conduit; and a controller in signal communication with the sensor and configured to indicate the level of $NO_x$ in the exhaust gas feed stream based on a signal from the sensor and to energize the injector to initiate delivery of the reactant into the exhaust gas feed stream when $NO_x$ constituents reach a predetermined level.

12. The exhaust aftertreatment system for an internal combustion engine of claim 7, further comprising spaced flow tabs extending outwardly from the baffle plate tip.

13. The exhaust aftertreatment system for an internal combustion engine of claim 12, wherein the spaced flow tabs extend to the inner wall of the exhaust gas conduit and are fixed thereto.

\* \* \* \* \*